United States Patent [19]

Hamilton et al.

[11] 4,431,784

[45] Feb. 14, 1984

[54] PROCESS FOR THE PREPARATION OF POLYMERS OF α-OLEFINS AT HIGH TEMPERATURES

[75] Inventors: Michael A. Hamilton; Vaclay G. Zboril, both of Kingston, Canada

[73] Assignee: Du Pont Canada Inc., Mississauga, Canada

[21] Appl. No.: 335,633

[22] Filed: Dec. 30, 1981

[51] Int. Cl.$^3$ .................... C08F 4/64; C08F 10/02
[52] U.S. Cl. .................... 526/116; 502/154; 526/153; 526/159; 526/348.2; 526/352
[58] Field of Search .................... 526/116, 153, 159

[56] References Cited

U.S. PATENT DOCUMENTS

| | | | |
|---|---|---|---|
| 2,954,367 | 9/1960 | Vandenberg | 526/153 |
| 3,058,963 | 10/1962 | Vandenberg | 526/153 |
| 3,135,702 | 6/1964 | de Vries et al. | 526/159 |
| 3,723,350 | 3/1973 | Schmidt et al. | 526/116 |
| 3,979,372 | 9/1976 | Bend et al. | 526/153 |
| 4,133,944 | 1/1979 | Cooper et al. | 526/159 |

Primary Examiner—Edward J. Smith

[57] ABSTRACT

A solution process for the preparation of high molecular weight homopolymers of ethylene and copolymers of ethylene and $C_3$–$C_{12}$ α-olefins is disclosed. The process involves feeding monomer, a particular coordination catalyst and hydrocarbon solvent to a reactor, polymerizing the monomer at a temperature of 105°–320° C. and recovering the polymer. The catalyst is obtained by combining solutions of titanium tetrahalide and of organoaluminum compound at a temperature of less than 30° C., heating the resulting admixture to a temperature of 150°–300° C. for a period of 10 seconds to 10 minutes and combining the thus heat-treated mixture with a solution of an organoaluminum compound. The catalyst thus obtained is fed to the process, without separation of any components of the catalyst. In an embodiment part of the titanium tetrahalide may be replaced with vanadium oxytrihalide.

19 Claims, No Drawings

PROCESS FOR THE PREPARATION OF POLYMERS OF α-OLEFINS AT HIGH TEMPERATURES

BACKGROUND OF THE INVENTION

1. Field of the Invention

The present invention relates to a process for the preparation of polymers of α-olefins, especially homopolymers of ethylene and copolymers of ethylene and higher α-olefins. In particular the invention relates to a solution process for the preparation of polymers of α-olefins in which α-olefin monomer is polymerized in the presence of a coordination catalyst capable of being used at relatively high polymerization temperatures, especially temperatures above 150° C.

2. Description of the Prior Art

Polymers of ethylene, for example, homopolymers of ethylene and copolymers of ethylene and higher α-olefins, are used in large volumes for a wide variety of end-uses, for example, in the form of film, fibres, moulded or thermo-formed articles, pipe, coatings and the like.

Processes for the preparation of homopolymers of ethylene and copolymers of ethylene and higher α-olefins are known. Such processes include processes in which the monomers are polymerized in the presence of a coordination catalyst, for example, a catalyst comprising a compound of a transition metal belonging to Groups IVB–VIB of the Periodic Table and an organometallic compound of a metal belonging to Groups I–IIIA of the Periodic Table.

There are two types of processes for the manufacture of polyethylene that involve the polymerization of monomers in the presence of a coordination catalyst viz. those which operate at temperatures below the melting or solubilization temperature of the polymer and those which operate at temperatures above the melting or solubilization temperature of the polymer. The latter are referred to as "solution" processes.

In processes operated below the melting or solubilization temperature of the polymer i.e. low temperature processes, ethylene is converted to solid polymer which remains suspended in an organic solvent as a "slurry" or is fluidized in a gaseous monomer stream. In general the molecular weight of the polymer is controlled by the use of hydrogen. Substantial amounts of hydrogen may be required. Preferred catalysts for the low temperature polymerization processes tend to exhibit high catalytic activity, not to adhere to the surface of the polymerization reactor and to yield polymer of high bulk density and of relatively low molecular weight, thereby lowering the need for hydrogen. In addition the ability of the catalyst to produce polymer in the form of regular and uniform particles may be an advantage.

A preferred process for the polymerization of α-olefins is the high temperature or "solution" polymerization process, an example of which is described in Canadian Pat. No. 660 869 of A. W. Anderson, E. L. Fallwell and J. M. Bruce, which issued Apr. 9, 1963. In a solution process the process is operated so that both the monomer and polymer are soluble in the reaction medium. Under such conditions accurate control over the degree of polymerization, and hence the molecular weight of the polymer obtained, is achieved by control of the reaction temperature. It is believed that the termination reaction controlling the molecular weight of the polymer is highly dependent on temperature. In an embodiment of a solution process, the molecular weight of the polymer may be further controlled through the use of relatively small amounts of hydrogen, as is described in Canadian Pat. No. 703,704 of C. T. Elston, which issued Feb. 9, 1965.

There are a number of advantages to a solution polymerization process, for example, the ability to control the molecular weight of the polymer obtained, the ability to operate the process as a continuous process and to recover the polymer by precipitation without the need for washing, the efficient use of catalyst, the properties of the polymer obtained and the possibility of efficient use of energy.

A disadvantage of a solution process is that part of the catalyst remains in the polymer of ethylene. Such catalyst, which may be referred to herein as "catalyst residue", may contribute to degradation of the polymer during subsequent processing of the polymer e.g., in extrusion, injection moulding and the like, and/or on exposure of fabricated articles to ultra violet light. The amount of catalyst residue is related, at least in part, to the overall activity of the catalyst employed in the polymerization step of the process as the higher the overall activity of the catalyst the less catalyst that is, in general, required to effect polymerization at an acceptable rate. Catalysts of relatively high overall activity are therefore preferred in solution polymerization processes.

Two important factors in determining the overall activity of a catalyst are the instantaneous activity of the catalyst and the stability of the catalyst under the operating conditions, especially at the operating temperature. Many catalysts that are stated to be very active in low temperature polymerization processes also exhibit high instantaneous activity at the higher temperatures used in solution processes. However such catalysts tend to decompose within a very short time in a solution process and thus the overall activity is disappointingly low. Such catalysts are of no commercial interest for solution processes. Other catalysts may exhibit acceptable overall activity at the higher temperatures of a solution process but show tendencies to yield polymers of broad molecular weight distribution or of too low a molecular weight to be commercially useful for the manufacture of a wide range of useful products. The requirements for and the performance of a catalyst in a solution polymerization process are quite different from those of a catalyst in a low temperature polymerization process, as will be understood by those skilled in the art.

A process for the preparation of polymers of ethylene at high temperatures in which the catalyst is a coordination catalyst consisting of titanium tetrachloride, a vanadium compound and aluminum trialkyl and capable of being used in a solution process is described in Canadian Pat. No. 635 823 of D. B. Ludlum, N. G. Merckling and L. H. Rombach, which issued Feb. 6, 1962.

The preparation of a heat-treated polymerization catalyst particularly adapted for the low temperature polymerization of propylene is described in Canadian Pat. No. 787 408 of R. H. Jones, which issued June 11, 1968. The catalyst is prepared by adding to a halide of a transition metal in its highest valence state the amount of an organometallic compound required to reduce the valence state of the transition metal by one, heat treating the admixture so obtained to form the violet form of titanium trichloride and then activating the resultant product with additional organometallic compound.

It is believed that the active spaces of a titanium-containing coordination catalyst is a reduced form of titanium, especially in the form of titanium trichloride. G. Natta et al discuss the crystalline modifications of titanium trichloride in J. Poly. Sci 51 399–410(1961). The performance of titanium trichloride as a catalyst species appears to relate to its crystal form, crystal size and size distribution, adsorbed species and the like which in turn depend on the method used in the preparation of the catalyst. A commercially available form of a titanium trichloride polymerization catalyst is $TiCl_3 \cdot \frac{1}{3}AlCl_3$ which is available from Stauffer Chemical Co. of Westport, Conn., U.S.A., under the trade designation "TiCl$_3$ AA". The violet form of titanium trichloride may be formed in the reactor of a solution polymerization process, especially when the temperature in the reactor is above 150° C.

SUMMARY OF THE INVENTION

A solution polymerization process for the preparation of homopolymers of ethylene and copolymers of ethylene and higher α-olefins, in which the catalyst is a coordination catalyst prepared by heat-treating a particular admixture of a titanium halide and an organoaluminum compound and then activating with further organoaluminum compound, has now been found. The catalyst has surprisingly good stability at the high temperatures employed in a solution polymerization process.

Accordingly the present invention provides in a solution process for the preparation of high molecular weight polymers of α-olefins selected from the group consisting of homopolymers of ethylene and copolymers of ethylene and $C_3$–$C_{12}$ α-olefins, said process comprising feeding monomer selected from the group consisting of ethylene and mixtures of ethylene and at least one $C_3$–$C_{12}$ α-olefin, a coordination catalyst and inert hydrocarbon solvent to a reactor, polymerizing said monomer at a temperature in the range of 105°–320° C. and recovering the polymer so obtained, the improvement wherein said coordination catalyst is obtained by combining a first component with a second component, said first component being obtained by admixing a solution of an organoaluminum compound in inert hydrocarbon solvent with a solution of titanium tetrahalide in inert hydrocarbon solvent at a temperature of less than 30° C. and heating the resultant admixture to a temperature of 150°–300° C. for a period of from 10 seconds to 10 minutes, said organoaluminum compound being of the formula $AlR_nX_{3-n}$ and being admixed with the titanium compound so that the atomic ratio of aluminum to titanium in the first component is in the range 0.2–2.0, said second component being a solution of organoaluminum compound in inert hydrocarbon solvent in which the organoaluminum compound is, independently, also of the formula $AlR_nX_{3-n}$, said first and second components being combined so that the atomic ratio of aluminum in the second component to titanium is in the range 0.9 to 3; where R is alkyl, cycloalkyl, aryl or alkyl-substituted aryl and has 1–20 carbon atoms, n=1, 1.5, 2 or 3 and X is halogen.

In an embodiment of the process of the present invention, the catalyst components are mixed in-line and fed to the reactor without separation of any fraction therefrom.

In another embodiment, the organoaluminum compound of the first and second component is the same.

In a further embodiment any halogen of the organoaluminum compound and that of the titanium tetrahalide is chlorine.

In yet another embodiment the solution of titanium tetrahalide contains vanadium oxytrihalide such that the atomic ratio of aluminum to titanium plus vanadium in the first component is in the range 0.2–2.0 and the atomic ratio of aluminum in the second component to titanium plus vanadium is in the range 0.9–3.0.

DETAILED DESCRIPTION OF THE INVENTION

The present invention is directed to a process for the preparation of high molecular weight polymers of α-olefins, such polymers being intended for fabrication into articles by extrusion, injection moulding, thermoforming, rotational moulding and the like. In particular the polymers of α-olefins are homopolymers of ethylene and copolymers of ethylene and higher α-olefins, especially such higher α-olefins having 3 to 12 carbon atoms i.e. $C_3$–$C_{12}$ α-olefins, examples of which are 1-butene, 1-hexene and 1-octene. In addition cyclic endomethylenic dienes may be fed to the process with the ethylene or mixtures of ethylene and $C_3$–$C_{12}$ α-olefin. Such polymers are known.

In the process of the present invention, monomer, a coordination catalyst and inert hydrocarbon solvent are fed to a reactor. The monomer may be ethylene or mixtures of ethylene and at least one $C_3$–$C_{12}$ α-olefin, preferably ethylene or mixtures of ethylene and one $C_4$–$C_{10}$ α-olefin. The coordination catalyst is formed by combining a first component with a second component. The first component is obtained by admixing, rapidly, a solution of an organoaluminum compound in inert hydrocarbon solvent with a solution of a titanium tetrahalide in inert hydrocarbon solvent so that the atomic ratio of Al:Ti is in the range of 0.2–2.0, especially 0.3–0.9. The preferred ratio may depend on the particular organoaluminum compound used in the preparation of the catalyst. The resultant admixture is then heat treated at 150°–300° C. for a period of 10 seconds to 10 minutes. The second component is a solution of an organo-aluminum compound in inert hydrocarbon solvent. The two components of the catalyst are combined so that the atomic ratio of aluminum in the second component to titanium in the first component is in the range of 0.9 to 3.0. The organo-aluminum compounds are each, independently, of the general formula $AlR_nX_{3-n}$ where R is an alkyl, cycloalkyl, aryl or alkyl-substituted aryl and has 1 to 20 carbon atoms, n is 3, 2, 1.5 or 1, and X is a halogen. In preferred embodiments n is 3, or especially, 2. R is preferably phenyl or alkyl, particularly alkyl of 1-4 carbon atoms. X is preferably bromine or chlorine. In preferred embodiments the organoaluminum compound is trialkyl aluminum, especially triethyl aluminum, or dialkylaluminum chloride, especially diethylaluminum chloride.

The organoaluminum compound in the first component may be the same as or different from the organoaluminum compound of the second component. It will, however, be generally convenient, and preferred, to use the same organoaluminum compound in both the first and the second components.

The preferred titanium tetrahalides are titanium tetrabromide and especially titanium tetrachloride. Mixtures of such tetrahalides may be used.

In an embodiment of the process of the present invention part of the titanium tetrahalide of the first component may be replaced with vanadium oxytrihalide, preferably vanadium oxytrichloride. Thus the solution of titanium tetrahalide may contain vanadium oxytrihalide such that the atomic ratio of aluminum to titanium plus vanadium in the first component is in the range 0.2–2.0 and the atomic ratio of aluminum in the second component to titanium plus vanadium is in the range 0.9–3.0.

The concentration of the components of the solutions used in the preparation of the catalyst is not critical and is primarily governed by practical considerations. The combining of the components is exothermic and the resultant evolution of heat is a factor in determining the upper concentration limits of the solutions. Concentrations up to about 50%, on a weight basis, may however be used. The lower concentration limits are related to practical considerations for example the amount of solvent required, the equipment being used and the like. Concentrations of as low as 25 ppm, on a weight basis, may be used but higher concentrations, for example 100 ppm and above, are preferred.

It is important to admix the two solutions of the first component at ambient or lower temperatures i.e. lower than 30° C., and permit reaction to occur for some minimum time. This time depends on the type of organoaluminum compound used and may be as short as 15 seconds after adequate mixing has been achieved. The subsequent heat treatment of the admixture of the first component may be performed by, for example, heating the admixture in a heat exchanger or by addition of a heated inert hydrocarbon solvent. Heat treatment is carried out at 150°–300° C., especially 170° to 250° C. The admixture should be held at the elevated temperature for a period of time in the range of from 10 seconds to 10 minutes, preferably 1 to 3 minutes, before it is combined with the second component. The first component may be fed into the polymerization reactor separately from the second component or the first and second components may be combined prior to being fed to the reactor.

The solvent used in the preparation of the coordination catalyst is an inert hydrocarbon, in particular a hydrocarbon that is inert with respect to the coordination catalyst. Such solvents are known and include for example, hexane, heptane, octane, cyclohexane, methylcyclohexane and hydrogenated naphtha. The solvent used in the preparation of the catalyst is preferably the same as that fed to the reactor for the polymerization process.

The coordination catalyst described herein is used in the process of the present invention without separation of any of the components of the catalyst. In particular neither liquid nor solid fractions are separated from the catalyst before it is fed to the reactor. Thus the preparation of the catalyst is a simple procedure and in a preferred embodiment involves in-line mixing and heat-treatment of the catalyst that is to be fed to the reactor.

The catalyst described herein may be used, according to the process of the present invention, over the wide range of temperature that may be used in an α-olefin polymerization process operated under solution conditions. For example, such polymerization temperatures may be in the range of 105°–320° C. and especially in the range 105°–310° C. The pressures used in the process of the present invention are those known for solution polymerization processes, for example, pressures in the range of about 4–20 MPa.

In the process of the present invention the α-olefin monomers are polymerized in the reactor in the presence of the catalyst. Pressure and temperature are controlled so that the polymer formed remains in solution. Small amounts of hydrogen, for example 1–40 parts per million by weight, based on the total solution fed to the reactor, may be added to the feed in order to improve control of the melt index and/or molecular weight distribution and thus aid in the production of a more uniform product, as is disclosed in the aforementioned Canadian Pat. No. 703 704. The catalyst is usually deactivated, for example by contacting with a fatty acid or an alcohol, immediately after the polymer leaves the reactor.

After deactivation of the catalyst the polymer may be passed through a bed of activated alumina or bauxite which removes part or all of the deactivated catalyst residues; however under some circumstances it may not be necessary to remove such residues from the polymer. The solvent may then be flashed off from the polymer which subsequently may be extruded into water and cut into pellets or other suitable comminuted shapes. Pigments, antioxidants and other additives may be added to the polymer either before or after the polymer is initially formed into pellets or other comminuted shapes.

As is illustrated in the examples below, the heat-treated catalyst exhibits good stability at very high temperatures when compared with catalysts which are not heat-treated or with catalysts prepared by mixing the titanium tetrahalide with the organoaluminum compound at high temperatures. It will also be noted that the catalyst of the process of the present invention is prepared by rapid in-line mixing of liquid components without separation of any fraction therefrom, for example by isolation and/or purification of any intermediate products, which greatly reduces the cost of using such catalyst.

The process of the present invention may be used to prepare homopolymers of ethylene and copolymers of ethylene and higher α-olefins having densities in the range of, for example, about 0.900–0.970 and especially 0.915–0.965; the polymers of higher density, e.g. about 0.960 and above, being homopolymers. Such polymers may have a melt index, as measured by the method of ASTM D-1238, condition E, in the range of, for example, about 0.1–200, and especially in the range of about 0.3–120. The polymers may be manufactured with narrow or broad molecular weight distribution. For example, the polymers may have a stress exponent, a measure of molecular weight distribution, in the range of about 1.1–2.5 and especially in the range of about 1.3–2.0. Stress exponent is determined by measuring the throughput of a melt indexer at two stresses (2160 g and 6480 g loading) using the procedures of the ASTM melt index test method, and the following formula:

$$\text{Stress exponent} = \frac{1}{0.477} \log \frac{(\text{wt. extruded with 6480 g wt.})}{(\text{wt. extruded with 2160 g wt.})}$$

Stress exponent values of less than about 1.40 indicate narrow molecular weight distribution while values above about 2.00 indicate broad molecular weight distribution.

The polymers produced by the process of the present invention are capable of being fabricated into a wide variety of articles, as is known for homopolymers of ethylene and copolymers of ethylene and higher α-olefins.

In the examples hereinafter the following procedures were used:

(i) Polymerization in a stirred reactor: The reactor was a 70 ml (depth=11.3 mm, diameter=88.9 mm) pressure vessel fitted with a six-bladed agitator having a diameter of 66.7 mm, a heating jacket, pressure and temperature controllers, two feed lines and an outlet line. The feed lines were located adjacent to the tips of the agitator blades while the outlet line was adjacent to the centre of the agitator. All the ingredients i.e., catalyst and monomers, were prepared as solutions in cyclohexane which had been purified by being passed through a silica gel bed, stripped with nitrogen and passed through another silica gel bed followed by beds of 4X molecular sieve and of alumina. The rates of feed of the first and second components of the catalyst were adjusted to produce the desired conditions in the reactor.

The first component of the catalyst was prepared from the individual solutions by either (a) using in-line mixing viz. by admixing the solutions using a 6.4 mm "T" union, (b) using a high turbulence mixing zone viz. by injecting one solution through a 1.6 mm OD tubing placed axially in the centre of a 6.4 mm OD tube through which the other solution was being passed, or (c) by admixing the individual solutions in a vessel from which the resultant admixture was being withdrawn as required, the admixture in the vessel being agitated using a stream of purified nitrogen. The desired hold-up times were achieved by adjusting the length of the tubing through which the components were being passed. All streams were preheated to the reaction temperature shortly before entering the reactor. The reactor pressure was kept constant at 7.5 MPa. The pumping rates and temperatures were maintained constant during each experiment. The initial (no conversion) monomer concentration in the reactor was 1–2 wt% in all experiments. A deactivator (calcium octoate solution in cyclohexane, about 0.25% Ca) was injected into the reactor effluent at the reactor exit. The pressure of the stream was then reduced to about 110 kPa (Abs.) and the unreacted monomer was continuously stripped off with nitrogen. The amount of unreacted monomer was monitored by gas chromatograph. The catalyst activity was defined as:

$$Kp = \frac{S.V. \times d[Q/(1-Q)]}{dc}$$

where Q is the conversion, i.e. the fraction of ethylene (monomer) converted to polymer at the optimum ratio of the first and second components, S.V. is the space velocity in the stirred reactor in min$^{-1}$ and c is the catalyst concentration, based on titanium plus vanadium, in the reactor in mmol/l. Kp was obtained by measuring the conversion Q at various concentrations of the first and second components.

After stripping the volatiles (monomers) from the product obtained, the product was cooled to about 20° C. and diluted with an equal volume of 2-propanol. 0.1% of Irganox ® 1010 antioxidant was added. The polymer was filtered from the resultant suspension and dried at about 20° C. in the dark.

(ii) Polymerization in a tubular reactor: The tubular reactor was 332 mm long with an initial diameter of 14.3 mm, decreasing in two steps to 11.1 mm and 6.35 mm respectively along its length. The total volume of the reactor was 27 ml. The front (inlet) end of the reactor was provided with three inlet ports; a stationary mixer was located downstream from the inlet ports. The incoming streams and the reactor conditions were kept constant during each experiment; in other respects, the tubular reactor was operated in a similar manner to the stirred autoclave. The catalyst activity for polymerization in a tubular reactor is defined as:

$$Kp = \frac{d[\ln 1/(1-Q)] \times S.V.}{dc}$$

the symbols being as defined above.

The present invention is illustrated by the following examples. In the examples the solvent was cyclohexane and the monomer was ethylene unless specified to the contrary.

EXAMPLE I

A batch of the first component of the catalyst was prepared by injecting, at 25° C., a 1.527 mol/l solution of triethylaluminum into a 3.6 mmol/l solution of titanium tetrachloride such that the atomic ratio of aluminium to titanium was 0.33. The resultant admixture was then heated, in a heat exchanger, at 230° C. for 7.6 minutes. The first component was then cooled to 25° C.

In the polymerization process, the second component, a 3.8 mmol/l solution of triethyl aluminum, was continuously admixed with the first component and fed to a stirred reactor. The rate of addition was adjusted to obtain an optimum activity, as measured by the rate of consumption of ethylene in the polymerization process, under the conditions being used. The atomic ratio of the amount of aluminum in the second component to the amount of titanium in the first component was 2.2. The polymerization temperature was 220° C. The activity, Kp, of this coordination catalyst in the polymerization of ethylene was 7.6 and 6.9 at space velocities of 0.45 and 0.29 min$^{-1}$ respectively.

This example shows the high activity and stability of a heat-treated catalyst in a process of the present invention even at high temperatures and low space velocities.

EXAMPLE II

The first component of the catalyst was prepared by in-line mixing, at 25° C., a 1.6 mmol/l solution of triethylaluminum and a 3.6 mmol/l solution of titanium tetrachloride such that the atomic ratio of aluminum to titanium was 0.33. After three minutes the resultant admixture was heated, in a heat exchanger, to 170° C. for three minutes. After cooling to 25° C., the first component so obtained was admixed with the second component of the catalyst, a 6.5 mmol/l solution of triethyl aluminum, using the procedure of Example I. The activity of this catalyst was found to be Kp=12.6 at S.V.=0.34 min$^{-1}$ for the polymerization of ethylene in the stirred reactor at 170° C.

This example shows the use of an active catalyst obtained by heat treating at as low as 170° C.

EXAMPLE III

The first component of the catalyst was prepared by in-lining mixing a 4.37 mmol/l solution of titanium tetrachloride and a 1.53 mmol/l solution of triethyl aluminum at 25° C. The atomic ratio of aluminum to titanium was 0.33. After three minutes the resultant admixture was heated in a heat exchanger to 250° C. and held at that temperature for 18 seconds. After cooling, the first component so obtained was fed into the stirred reactor. The second component, a stream of 8.5 mmol/l triethyl aluminum was mixed in-line with an ethylene solution and fed into the reactor. The rate of addition of the second component was adjusted so that an optimum catalyst activity was obtained; that ratio was found to be an atomic ratio of aluminum in the second component to titanium of 2.3. The polymerization was carried out at 235° C. and 0.36 min$^{-1}$ S.V. The catalyst activity was found to be Kp=2.7.

The above procedure was repeated except that the first component was held at a temperature of 250° C. for 2.5 minutes. The Kp obtained was 4.9.

This example shows that an active catalyst for the process of the present invention can be obtained when the second component is contacted with the remainder of the catalyst in the reactor.

EXAMPLE IV

The first component of the catalyst was prepared by intensive in-line mixing of a 3.6 mmol/l solution of titanium tetrachloride and a 1.53 mmol/l solution of triethyl aluminum at 25° C. for about 23 seconds. A high turbulence zone was used to mix the two solutions. The atomic ratio of aluminum to titanium was 0.42. The first component was heat treated in a heat exchanger at a temperature of 200° C. for 2.6 minutes, cooled and the second component, a 10 mmol/l solution of triethyl aluminum was mixed continuously with the first component. The rate of addition was adjusted so as to obtain the optimum activity of the catalyst. This was found to be an atomic ratio of aluminum in the second component to titanium of 2.2 A hold-up time between the admixing of the first and second components and the feeding of the resultant catalyst into the stirred reactor of thirty seconds was used. The catalyst activity at 235° C. and 0.36 min$^{-1}$ S.V. was Kp=5.5.

This example shows that the catalyst for the process of the present invention may be cooled before being fed to the reactor.

EXAMPLE V

A batch of the first component was prepared by injecting a 1.527 mol/l solution of triethylaluminum into a 3.6 mmol/l of titanium tetrachloride at 25° C. The atomic ratio of aluminum to titanium was 0.33. The resultant admixture was heated in a heat exchanger at a temperature of 200° C. and held at that temperature for three minutes. Then, without cooling the first component so obtained, the second component, a 6 mmol/l solution of triethyl aluminum was continuously added to the first component. The resultant catalyst was fed into the tubular reactor after a period of about 15 seconds. The polymerization temperature was 242° C. The optimum activity of the catalyst was achieved when the rate of addition of the second component to the first component was adjusted to obtain a ratio, on an atomic basis, of aluminum in the second component to titanium of 2.2. The activity was Kp=5.0 at S.V.=0.91 min$^{-1}$.

This example shows that for the process of the present invention it is not necessary to cool the first component before the second component is added.

EXAMPLE VI

The first component was prepared by in-line mixing a 3.6 mmol/l solution of titanium tetrachloride and a 1.53 mmol/l solution of triethyl aluminum at 25° C. The atomic ratio of aluminum to titanium was 0.40. After 40 seconds the resultant admixture was heated to 225° C. by injecting a stream of cyclohexane preheated to a temperature of 320° C. into the admixture. The resultant first component was maintained at 225° C. for 1.5 minutes and was then fed into the stirred reactor. The second component, a stream of 6 mmol/l triethyl aluminum, was mixed in-line with the ethylene solution and fed into the reactor. The rate of addition of the second component was adjusted so that the optimum catalyst activity was obtained. The atomic ratio of the aluminum in the second component to titanium was 2.2. The polymerization was carried out at 200° C. and 0.33 min$^{-1}$ S.V. The catalyst activity was Kp=11.2.

This example shows that the rate of heating during the heat treatment of the catalyst for the process of the present invention may be very rapid.

EXAMPLE VII

A batch of the first component was prepared by injecting a 1.527 mol/l solution of triethyl aluminum into a 2.5 mmol/l solution of titanium tetrachloride and vanadium oxytrichloride at 25° C. The ratio on an atomic basis of titanium to vanadium was 20:80. The resultant admixture was heated to temperatures of up to 250° C. The second component, a 4.75 mmoles/l solution of isoprenyl aluminum, was continuously added to the first component and the resultant catalyst was fed into a stirred autoclave. The polymerization temperature was 200° C. and the atomic ratio of aluminum in the second component to titanium plus vanadium was 2.5. A S.V. of 0.35 min$^{-1}$ was used. The results obtained showed that the catalyst activity with a catalyst containing vanadium was at least as good as related catalysts without vanadium. In addition catalyst activity was higher for catalyst that had been heat treated at temperatures above 150° C. than for catalyst that had not been heat treated.

EXAMPLE VIII

A batch of the first component was prepared by injecting a 1.476 moles/l solution of diethylaluminum chloride into a 10 mmoles/l solution of titanium tetrachloride at 25° C. The atomic ratio of aluminum to titanium was 1.0. The resultant admixture was heated in line to 225° C. by injecting a stream of cyclohexane preheated to a temperature of 260° C. into the admixture. The resultant first component was maintained at 225° C. for 1.5 minutes and was then fed into the stirred reactor. The second component, a stream of 30 mmoles/l of triethyl aluminum, was admixed with a monomer stream of ethylene and octene-1 (molecular ratio 0.58) in cyclohexane and fed to the reactor. The rate of addition of the second component was adjusted so that the optimum catalyst activity was obtained. The atomic ratio of aluminum in the second component to titanium was 3.1:1. The polymerization was carried out at 171° C. and a S.V. of 0.32 min$^{-1}$. The catalyst activity was Kp=15.2 and the ethylene/octene-1 copolymer obtained had a density of 0.9260 g/cm$^3$.

This example shows the use of a catalyst of the invention in the copolymerization of ethylene and a comonomer viz. octene-1.

EXAMPLE IX

The first component was prepared by in-line mixing a 3.6 mmol/l solution of titanium tetrachloride and a 1.8 mmol/l solution of diethyl aluminum chloride at 25° C., such that the atomic ratio of aluminum to titanium was 0.72. After 1.3 minutes the resultant admixture was heated to 250° C. by injecting a stream of cyclohexane preheated to a temperature of 360° C. into the solution. The first component so obtained was held at 250° C. for 1.2 minutes and then fed into the stirred reactor. The second component, a stream of 6 mmol/l triethyl aluminum, was mixed in-line with the ethylene solution and fed into the reactor. The rate of addition of the second component was adjusted so that the optimum catalyst activity was obtained. The atomic ratio of aluminum in the second component to titanium was 2.3. The polymerization was carried out at 200° C. and 0.34 min$^{-1}$ S.V. The catalyst activity was Kp=12.7.

This example shows that diethylaluminum chloride may be used in place of triethyl aluminum in the process of the present invention.

EXAMPLE X

In a comparative experiment, the catalyst was prepared by in-line mixing a 1.8 mmol/l solution of titanium tetrachloride with a 3.6 mmol/l solution of triethyl aluminum. At room temperature (25° C.), the catalyst solution was injected into the stirred reactor. The reactor temperature was 200° C. and the space velocity 0.85 min$^{-1}$. The optimum activity was obtained with an atomic ratio of aluminum to titanium of 1.65. The activity measured was Kp=1.36.

This example shows that heat treatment in the polymerization zone gives a catalyst of relatively poor activity.

EXAMPLE XI

In another comparative experiment the first component was prepared by in-line mixing a 2.8 mmol/l solution of titanium tetrachloride with a 0.93 mmol/l solution of triethyl aluminum in the ratio of 0.33 (aluminum:titanium, atomic basis) at 25° C. However the first component was not heat treated. About 2 minutes later the second component, a 3.27 mmol/l solution of triethyl aluminum, was mixed with the first component. The resultant catalyst was fed to the tubular reactor after an additional 30 seconds. The reactor temperature was 200° C. The optimum activity was achieved when the atomic ratio of aluminum in the second component to titanium was 2.45. The activity was Kp=4.4 and 2.9 at S.V. of 0.85 and 0.75 min$^{-1}$ respectively.

Although these results show improved activity over that of the catalyst of Example X, the catalyst stability is poor in that Kp falls substantially when the space velocity is reduced i.e. longer "hold-up time" at the reactor temperature.

EXAMPLE XII

In a comparative experiment the first component was prepared by in-line mixing a 3.17 mmol/l solution of titanium tetrachloride and a 1.06 mmol/l solution of triethyl aluminum in the ratio of aluminum to titanium of 0.33 (atomic basis). The two solutions were heated to 180° C. before mixing to form the first component and then kept at 180° C. for an additional 7.5 minutes. The first component was then cooled to about 25° C. and a 3.8 mmol/l solution of triethyl aluminum was admixed in-line. The optimum activity was achieved when the second component was added so that the atomic ratio of aluminum in the second component to titanium was 1.2. The resultant catalyst solution was fed into the tubular reactor. The polymerization activity of the catalyst was very low. Even if the polymerization temperature was lowered to 170° C. the activity obtained was Kp<0.69 at S.V.=0.27 min$^{-1}$.

This example shows that heating the two solutions of the first component prior to admixing results in no appreciable activity in the resultant catalyst.

EXAMPLE XIII

The first component was prepared by in-line mixing a 3.6 mmol/l solution of titanium tetrachloride with a 1.6 mmol/l solution of triethylaluminum at 25° C. In different experiments four ratios of titanium to aluminum were used. After about one minute the admixtures obtained were heated, in a heat exchanger, to 170° C. and maintained at that temperature for 2.5 minutes. Without cooling, the resultant first component was continuously admixed with the second component, a 6.5 mmol/l solution of triethylaluminum. After about 15 seconds, the catalyst so formed was fed to the stirred reactor. The polymerization temperature was 200° C. and the S.V. was 0.33 min$^{-1}$. The optimum activity of the catalyst was achieved when the atomic ratio of aluminum in the second component to titanium was 2.7 in all cases.

The results obtained were as follows:

| Run | Aluminum/Titanium Ratio in First Component | Catalyst Activity Kp |
|---|---|---|
| 4 | 0.17 | 0.6 |
| 5 | 0.25 | 6.3 |
| 6 | 0.33 | 12.6 |
| 7 | 0.50 | 9.0 |

EXAMPLE XIV

The catalyst was prepared using the procedure of Example XIII except that the first component was heated at 200° C. for 2.6 minutes, the polymerization temperature was 235° C. and S.V. was 0.36 min$^{-1}$. The optimum atomic ratio of aluminum in the second component to titanium was 2.0.

The results obtained were as follows:

| Run | Aluminum/Titanium Ratio in First Component | Catalyst Activity Kp |
|---|---|---|
| 8 | 0.33 | 4.7 |
| 9 | 0.42 | 6.5 |
| 10 | 0.50 | 1.4 |

Examples XIII and XIV show that the optimum ratio of aluminum to titanium in the first component is related to the conditions used to heat-treat the first component. Moreover the polymerization reaction does not need to be carried out with a "stoichiometric" catalyst viz. a catalyst having a ratio of aluminum to titanium in the first component of 0.33, when the aluminum compound is triethyl aluminum and the titanium compound is titanium tetrachloride.

EXAMPLE XV

The first component was prepared by in-line mixing a 3.6 mmol/l solution of titanium tetrachloride with a 2.4 mmol/l solution of triethylaluminum. The atomic ratio of aluminum to titanium was 0.33. After about one minute the mixture obtained was heated, in a heated exchanger, to a pre-selected temperature and kept at that temperature for 7.6 minutes. Without cooling, the first component so obtained was continuously admixed with a 5.5 mmol/l solution of triethylaluminum and, after 15 seconds, fed to the stirred reactor. The polymerization temperature was 200° C. and the S.V. was 0.33 min$^{-1}$.

The optimum activity was obtained when the atomic ratio of aluminum in the second component to titanium was 2.00 in all runs.

The results obtained were as follows:

| Run | Pre-Selected Heat Treatment (°C.) | Catalyst Activity Kp |
|---|---|---|
| 11 | 93 | 0.9 |
| 12 | 143 | 7.7 |
| 13 | 188 | 7.1 |
| 14 | 236 | 5.1 |

EXAMPLE XVI

The catalyst was prepared using the procedure of Example XV, except that the atomic ratio of aluminum to titanium in the first component was 0.42, the mixture was heated to the pre-selected temperature by injecting a stream of cyclohexane, pre-heated to 360° C., into the mixture and the period of heat-treatment was 40 seconds. The optimum atomic ratio of aluminum in the second component to titanium was 2.24. The polymerization temperature was 235° C. and the S.V. was 0.38.

The results obtained were as follows:

| Run | Pre-Selected Heat Treatment (°C.) | Catalyst Activity Kp |
|---|---|---|
| 15 | 175 | 2.3 |
| 16 | 200 | 4.3 |
| 17 | 225 | 4.8 |
| 18 | 250 | 4.3 |

Examples XV and XVI demonstrate that the optimum heat treatment temperature depends on the heat treatment time and/or the conditions under which the catalyst obtained is used.

EXAMPLE XVII

The first component of the catalyst was obtained by suspending TiCl₃ AA catalyst, from Stauffer Chemical Co., in purified mineral oil at a concentration of 3.88 mmol/l. In a polymerization process, the second component, a 6.8 mmol/l solution of triethyl aluminum, was continuously admixed with the first component and fed to a stirred reactor. The rate of addition was adjusted to obtain an optimum activity, as measured by the rate of consumption of ethylene in the polymerization process, under the conditions being used. The atomic ratio of the amount of aluminum in the second component to the amount of titanium in the first component was 1.75. The polymerization temperature was 170° C. The activity, Kp, of this coordination catalyst in the polymerization of ethylene was 1.1 at a space velocity of 0.266 $\text{min}^{-1}$.

This example shows that use of a commercial TiCl₃·⅓AlCl₃ catalyst is inferior to the process of the present invention, even though the temperature was only 170° C.

We claim:

1. In a solution process for the preparation of high molecular weight polymers of α-olefins selected from the group consisting of homopolymers of ethylene and copolymers of ethylene and $C_3$-$C_{12}$ α-olefins, said process comprising feeding monomer selected from the group consisting of ethylene and mixtures of ethylene and at least one $C_3$-$C_{12}$ α-olefin, a coordination catalyst and inert hydrocarbon solvent to a reactor, polymerizing said monomer at a temperature in the range of 105°–320° C. and recovering the polymer so obtained, the improvement wherein said coordination catalyst is obtained by combining a first component with a second component, said first component being obtained by admixing a solution of an organoaluminum compound in inert hydrocarbon solvent with a solution of titanium tetrahalide in inert hydrocarbon solvent at a temperature of less than 30° C. and heating the resultant admixture to a temperature of 150°–300° C. for a period of from 10 seconds to 10 minutes, said organoaluminum compound being of the formula $AlR_nX_{3-n}$ and being admixed with the titanium compound so that the atomic ratio of aluminum to titanium in the first component is in the range 0.2–2.0, said second component being a solution of organoaluminum compound in inert hydrocarbon solvent in which organoaluminum compound is, independently, also of the formula $AlR_nX_{3-n}$, said first and second components being combined so that the atomic ratio of aluminum in the second component to titanium is in the range 0.9 to 3; where R is alkyl, cycloalkyl, aryl or alkyl-substituted aryl and has 1–20 carbon atoms, n = 1, 1.5, 2 or 3 and X is halogen.

2. The process of claim 1 in which the catalyst components are mixed in-line and fed to the reactor without separation of any fraction therefrom.

3. The process of claim 2 in which the organoaluminum compound of the first component is the same as that of the second component.

4. The process of claim 2 in which the organoaluminum compound of the first component is different from that of the second component.

5. The process of claim 3 in which the monomer is ethylene.

6. The process of claim 3 in which the monomer is a mixture of ethylene and a $C_4$-$C_{10}$ α-olefin.

7. The process of claim 5 or claim 6 in which R is $C_1$-$C_4$ alkyl.

8. The process of claim 5 or claim 6 in which any halogen is chlorine or bromine.

9. The process of claim 5 or claim 6 in which the organoaluminum compound is triethyl aluminum in both instances and the titanium tetrahalide is titanium tetrachloride.

10. The process of claim 5 or claim 6 in which the organoaluminum compound is diethylaluminum chloride in both instances and the titanium tetrahalide is titanium tetrachloride.

11. The process of claim 5 or claim 6 in which n=2.

12. The process of claim 5 or claim 6 in which n=3.

13. The process of claim 2 in which the solution of titanium tetrahalide contains vanadium oxytrihalide such that the atomic ratio of aluminum to titanium plus vanadium in the first component is in the range 0.2–2.0 and the atomic ratio of aluminum in the second component to titanium plus vanadium is in the range 0.9–3.0.

14. The process of claim 5 or claim 6 in which the solution of titanium tetrahalide contains vanadium oxytrihalide such that the atomic ratio of aluminum to titanium plus vanadium in the first component is in the range 0.2–2.0 and the atomic ratio of aluminum in the second component to titanium plus vanadium is in the range 0.9–3.0 and in which any halogen is chlorine.

15. The process of any one of claim 1, claim 2 or claim 3 in which any halogen is chlorine.

16. The process of any one of claim 4, claim 5 or claim 6 in which any halogen is chlorine.

17. The process of any one of claim 2, claim 5 or claim 6 in which the atomic ratio of aluminum to titanium in the first component is in the range 0.3–0.9.

18. The process of claim 1 in which, in the recovery of the polymer, the catalyst is deactivated and the resultant solution is passed through a bed of activation alumina or bauxite to remove at least part of the deactivated catalyst residues so obtained.

19. The process of claim 1 in which, in the recovery of the polymer, the catalyst is deactivated and the catalyst residues so obtained remain in the polymer.

* * * * *